May 17, 1932. P. A. HARSEM 1,858,326
ARRANGEMENT FOR SECURING ELASTIC ARTICLES TO RIGID SUPPORTS
Filed May 7, 1930
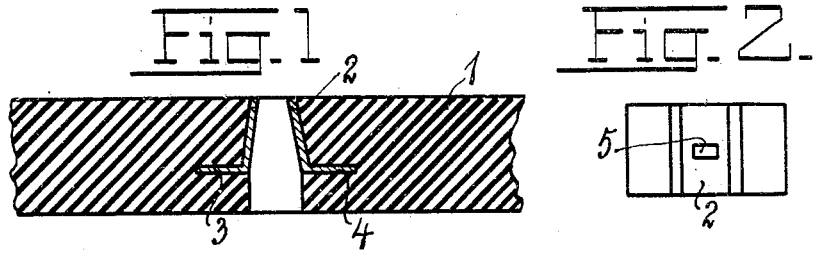
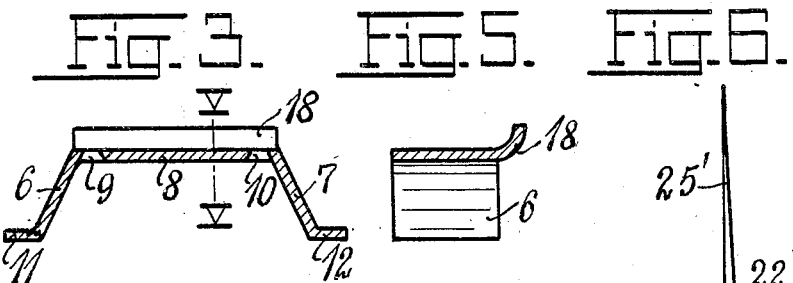
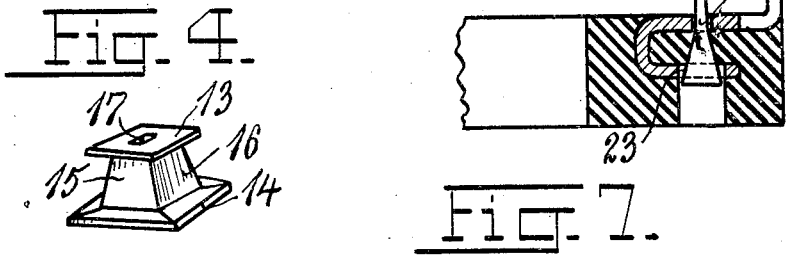
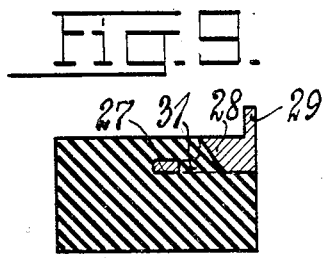
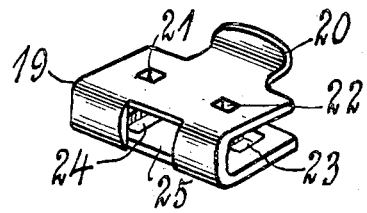
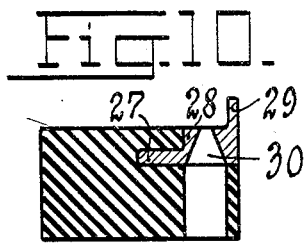
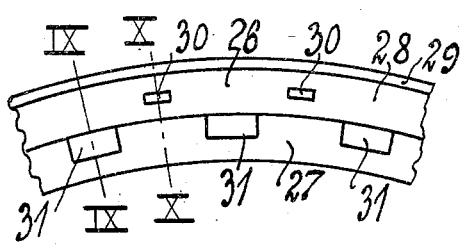
P. A. Harsem
INVENTOR
By: Marks & Clerk
Attys Patented May 17, 1932

1,858,326

UNITED STATES PATENT OFFICE

PETER ANDREAS HARSEM, OF OSLO, NORWAY, ASSIGNOR TO IMPERATOR HESTESKO A/S, OF TONSBERG, NORWAY, A NORWEGIAN CONCERN

ARRANGEMENT FOR SECURING ELASTIC ARTICLES TO RIGID SUPPORTS

Application filed May 7, 1930, Serial No. 450,524, and in Norway January 29, 1930.

The present invention relates to inflexible seatings for the heads of the nails used in securing elastic articles to rigid supports. More particularly the present invention is applicable to horseshoes of elastic material such as rubber in which a device is cast in the shoe and ensures the fastening of the nail and thus the fixing of the shoe to the hoof. It is generally known to cast in an inflexible seating for the head of the nail in elastic rubber material, for example in the case of rubber horseshoes. Hitherto this seating has consisted of a flat metal plate introduced within the rubber. In securing the shoe the nail is driven through an aperture provided in said plate into the hoof and the point of the nail which penetrates to the exterior of the outer wall of the hoof is bent over. The disadvantage is involved that there is a layer of elastic material between the inflexible seating and the hoof which gives when the nail is driven in and thus makes it impossible to effect a reliable fixing of the nail. Already before the nail projecting from the wall of the hoof is bent over, the nail will have become loose and thus a reliable fastening of the shoe to the hoof is impossible from the start. If in spite of this it should chance that the nail is properly fastened, that portion of the nail between the point where it enters the hoof and the point where the head seats will be subjected to a continuous bending to and fro and this bending will ultimately cause the nail to fracture at the point where it enters the hoof.

This straining occurs more particularly in a lateral direction as the branches of the shoe tend to move outwardly and each individual nail must be strong enough to resist this bending, and this disadvantage is increased in that the material between the said seating and the hoof has a constant resilient action when the shoe is in use and thus causes the head of the nail to be subjected to a non-uniform strain which sooner or later causes the nail to break.

The object of the present invention is to reduce or to overcome these disadvantages by using a seating of special construction for the head of the nail. The nail seating according to the invention is constructed in such manner as to prevent a lateral bending of that portion of the nail which projects from the hoof inasmuch as there is no elastic material between the seating and the hoof, and the effect can be assisted by providing in addition lateral support for the head of the nail in the seating. The possibilities of use of this seating are in no way restricted to rubber covering nor to the particular form of a rubber horseshoe, but it may be used with advantage in connection with any desired elastic object which is to be secured by means of nails to a rigid support and which is subjected to a non-uniform strain occasioning a bending or similar straining of the nail. According to the invention the nail seating is shaped in such manner that a greater or less part of the surface of the seating is in direct contact with the rigid support to which the elastic object is to be secured, and at the same time the seating has portions extending into the elastic material and anchored therein. If desired these portions can be formed so as to support the outer end of the head of the nail, but it has been found that this is not necessary in every case.

The seating may be given any desired shape; certain embodiments of the invention as found to be particularly suitable for use in connection with rubber horseshoes are illustrated by way of example in the accompanying drawings, in which:

Fig. 1 is a section through a fragment of a rubber horseshoe provided with a seating for the head of the nail.

Fig. 2 shows the cast-in seating of Fig. 1 as seen from above.

Fig. 3 is a section through a seating of different construction.

Fig. 4 shows a further embodiment of the invention.

Fig. 5 is a section along the line V—V of Fig. 3.

Fig. 6 is a section through a part of a horseshoe incorporating a further embodiment of the invention.

Fig. 7 is a perspective view of the seating shown in Fig. 6.

Fig. 8 is a plan view of an embodiment of the invention in which the seating is made sufficiently long to accommodate a series of nails.

Fig. 9 shows a section through a seating of the type shown in Fig. 8 cast in a horseshoe. The section follows the line IX—IX of Fig. 8.

Fig. 10 is another section of the construction shown in Fig. 9 and corresponding to the line X—X of Fig. 8.

In Fig. 1 of the drawings a V-shaped metal member 2 is cast in the elastic material, the pointed end of the V extending to the upper surface of the elastic object 1.

Projecting arms 3 and 4 are disposed at the lower ends of the limbs of the V and serve for ensuring the anchorage in the elastic material 1. As described subsequently these limbs may be apertured in order to ensure that the rubber is more securely fixed to the seating. The breadth of the metal member 2 can be chosen as desired and preferably is many times broader than the dimension of the nail aperture 5.

According to the invention the angle between the limbs of the V can be so chosen that it corresponds exactly to the taper of the head of the nail. In this manner a reliable and firm fixing between the head and the seating is ensured. When the nail is driven in it effects a perfectly reliable and rigid fastening between the rigid support and the seating 2, and the insertion 2 serves directly for securing the elastic material 1 as it is cast in this material.

A section through another embodiment of a seating for the head of the nail is shown in Fig. 3. In this case the metal plate is bent into the shape of a U and the breadth between the limbs 6, 7 is sufficiently large to afford space for two nail holes 9 and 10 in the flat section 8. In this manner the nails serve to support each other. As in the previously described embodiment the limbs 6, 7 of this construction are provided with projecting arms 11 and 12. If desired the nail holes 9 and 10 may be given a shape corresponding to the contour of the head of the nail in order to ensure the reliable fastening of the nail.

In addition one lateral edge of the seating may in this case be provided with an upwardly curved edge 18 which constitutes a lateral support for the hoof of the horse when the seating is properly cast in the shoe.

Fig. 4 shows a third embodiment of a seating for the head of the nail according to the present invention. The seating consists of a sheath or eye which completely surrounds the head of the nail. When the sheath is cast in the elastic material the surface 13 of the sheath lies in the surface of the material and the larger lower portion 14 of the sheath serves for anchoring the sheath in the elastic material. The interior of the lateral walls 15 can be given exactly the same form as the head of the nail and merges into an aperture 17 which may have exactly the same form and dimensions.

In Figs. 6 and 7 the seating consists of a metal member 19 bent in the form of a U, one limb of which may be provided with an upwardly bent edge 20. The metal member 19 may be made longer or shorter and may for example be used for fastening two nails by providing two small nail holes 21, 22 in the limb which is to coincide with the upper surface of the elastic material whereas the holes 23 and 24 in the other limb are of the same size as the head of the nail. In Fig. 6 the seating is indicated and a nail 25' shown in the position which it will take up when the shoe is fastened to the hoof. The upwardly bent edge 20 serves as a lateral guide for the hoof as has previously been described in connection with Figs. 3 and 5. In order to ensure that the rubber or other elastic material should be secured to the seating one or more apertures 24 may be provided as shown in the drawings by means of which a connection is formed between the rubber on the outside and the rubber between the limbs of the seating.

In the embodiment shown in Figs. 8, 9, and 10 the seating consists of a metal member or strip 26 which in section consists of three steps, a lower step 27 which is cast in the elastic material, a middle step 28 which lies in the same plane as the surface of the material, and an upper edge 29 which forms a lateral guide for the object to which the material is to be fastened. The metal member 26 may be provided with holes 30 of a shape corresponding to the shape of the head of the nail and also with apertures 31 which ensure that the elastic material outside the metal member is connected with the material beneath the metal member.

What I claim is:—

1. For use in securing an elastic horseshoe to the hoof, an inflexible seating for the shoe for the head of a nail, said seating consisting of upper and lower limbs rigidly connected at one of their ends and disposed in vertical spaced relation, the lower limb being fully embedded in the shoe, the upper limb having its upper surface exposed and being in a plane with the upper face of the shoe.

2. For use in securing an elastic horseshoe to the hoof, an inflexible seating for the shoe, said seating consisting of upper and lower limbs connected by a web at one end of their edges, the lower limb being embedded in the shoe while the upper limb has its upper surface exposed and lying in a plane with the upper surface of the shoe.

3. For use in securing an elastic horseshoe to the hoof, an inflexible seating consisting of spaced limbs, one limb lying in a plane with the upper surface of the shoe for intimate engagement with the hoof, a web connecting one of the edges of the limbs, the upper limb having an upwardly bent portion upon its free edge for engaging the margin of the hoof.

4. As a new article of manufacture, a nail seating consisting of a sheet-metal member bent into U-shaped form, the bight portion maintaining the limbs in spaced relation, one limb having an upwardly bent portion upon its free edge, and nail-receiving openings in the limb.

In testimony whereof I have signed my name unto this specification.

PETER ANDREAS HARSEM.